UNITED STATES PATENT OFFICE.

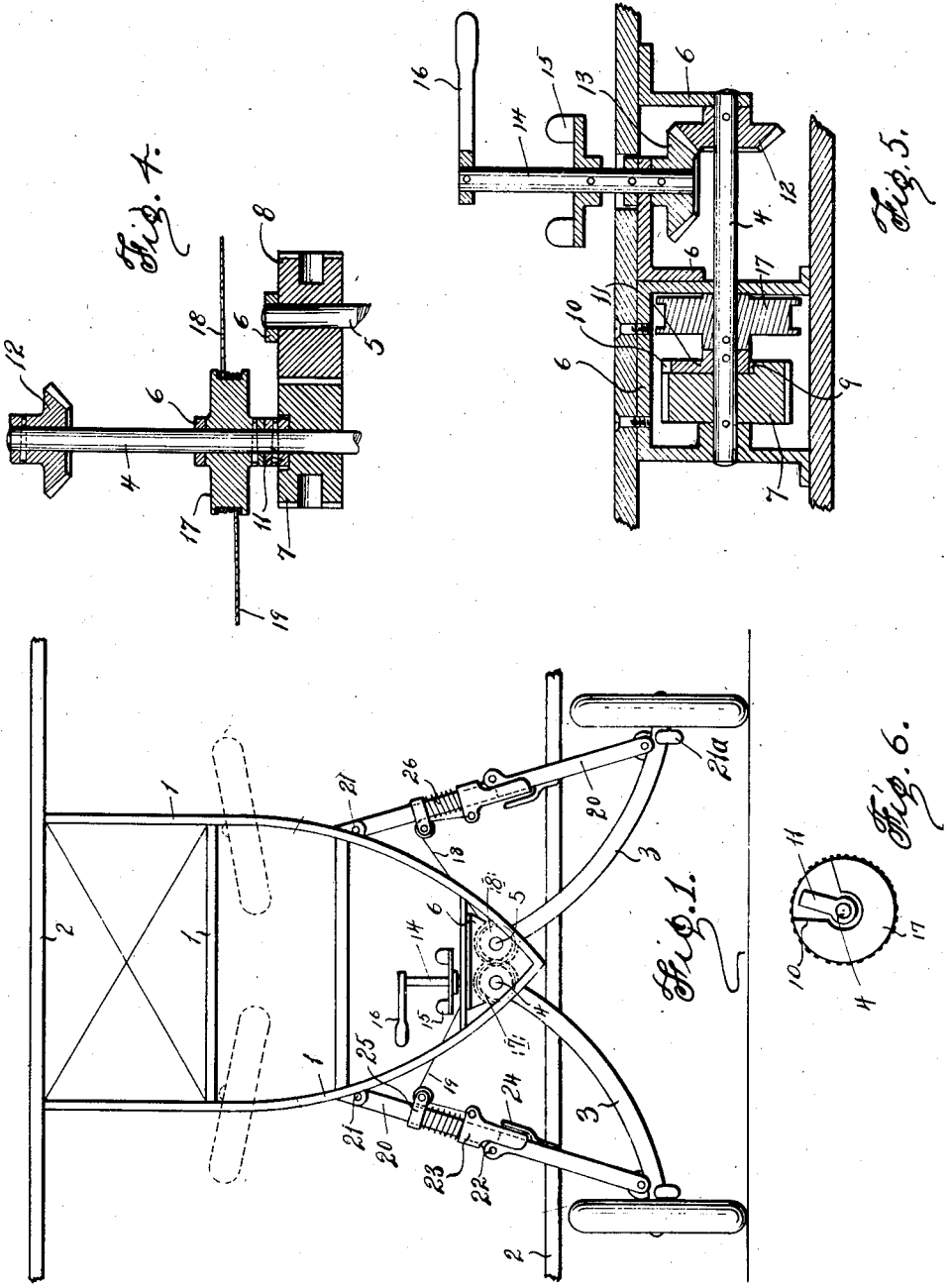

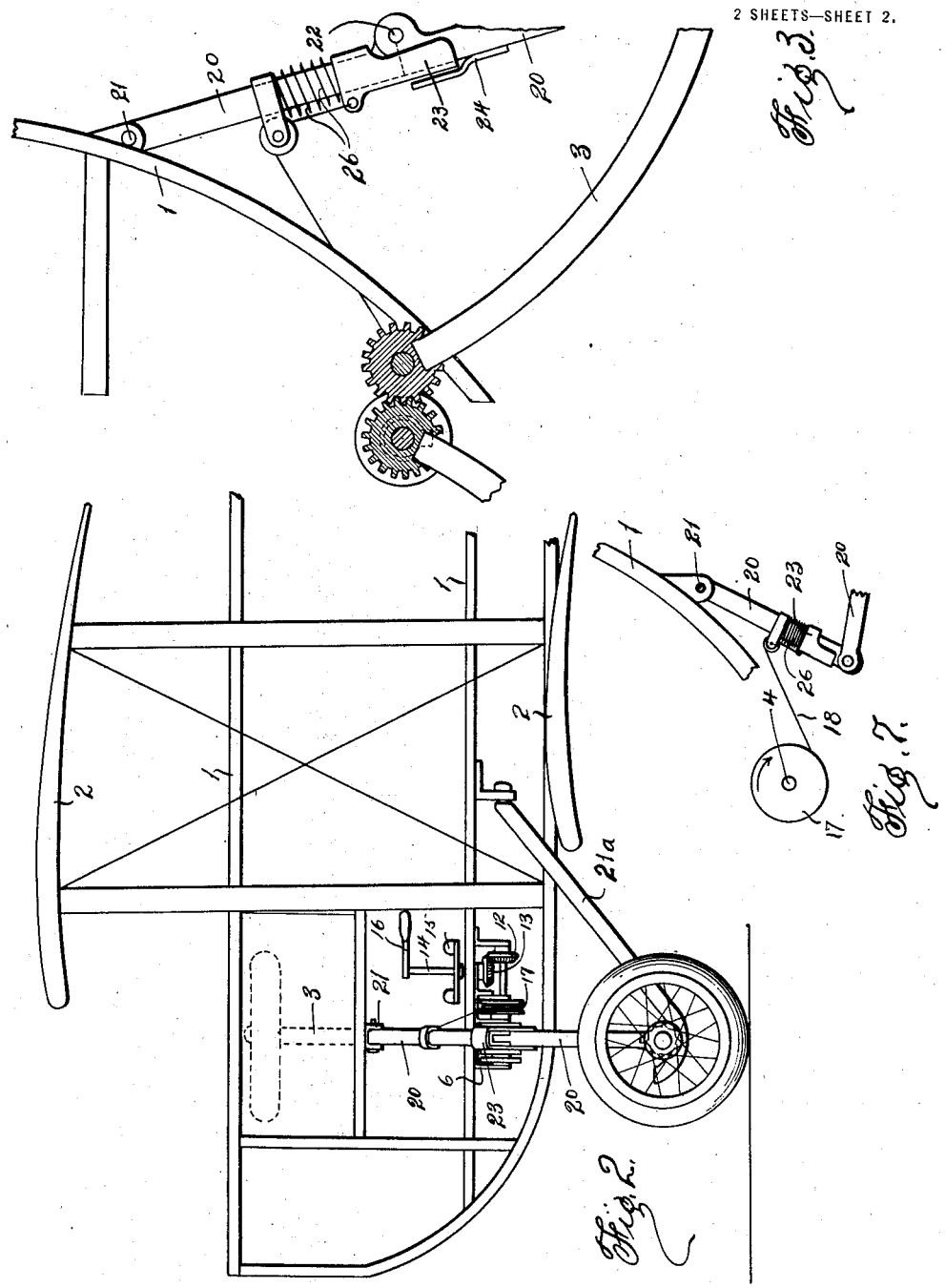

FRANK McCARROLL, OF DALLAS, TEXAS.

FOLDING LANDING-GEAR FOR AIRCRAFT.

1,329,533.   Specification of Letters Patent.   Patented Feb. 3, 1920.

Application filed October 19, 1918. Serial No. 258,867.

*To all whom it may concern:*

Be it known that I, FRANK McCARROLL, citizen of the United States, residing at Dallas, in the county of Dallas and State of Texas, have invented certain new and useful Improvements in Folding Landing-Gears for Aircraft, of which the following is a specification.

This invention relates to a new and useful improved form of landing gear for aircraft, and in particular it appertains to a foldable running and landing gear for air machines. The invention with its purposes has in view the provision of a landing gear for the heavier-than-air type craft, but it may be adapted to other aircraft if so desired.

The primary purpose of this invention, and the disclosure made herewith by this description and the accompanying drawings, is to make a form of folding and disappearing landing gear which may be caused to assume the same relative position with the main body or the fuselage of the plane, as the legs or the appendages of flight fowls assume when they arise from the ground and take flight under nature's most ideal conditions. It is therefore a purpose to provide a form of folding gear, comprising the wheels and attendant parts, which will pass into the breast or fuselage of the airplane when it has taken off and reached sustention on the air.

This purpose is fundamentally necessary in accomplishment if the future modern aircraft are to more nearly attain maximum efficiency. The reduction to a minimum of the head-resistance of the craft is one of the broad purposes of this conception. Craft fitted with folding running gear will be enabled to materially increase their cruising radius by increasing the speed of the plane and economizing in fuel consumption.

A further purpose is to provide dependable and positively operated mechanical means under control of the pilot for folding the landing gear into its assigned position within the inclosed body of the machine. This operation is conveniently carried out through hand actuating mechanism adjacent the pilot's seat and comprises a part of this invention.

Among the several features of the present disclosure is the locking and unlocking means which so coöperate with the whole of the apparatus as to insure positiveness in operation during the exercise of the parts by the aviator when he desires to either fold up the gear after leaving the ground or unfolding the alighting gear when returning to the earth.

With the above and other objects in view the invention has relation to a certain combination and arrangement of parts, an example of which is described in the following specification, pointed out in the appended claims and illustrated in the accompanying drawings; wherein, Figure 1 illustrates a view of the folding landing gear in front elevation.

Fig. 2 shows the apparatus in side elevation.

Fig. 3 illustrates a half view of the front of the gear showing only important elements of the devices.

Fig. 4 is a sectional view taken upon the line 4—4 of Fig. 1.

Fig. 5 is a sectional view taken upon the line 5—5 of Fig. 1.

Fig. 6 is a detail view in section taken on the section line 6—6 of Fig. 5.

Fig. 7 is a partial view of the folding gear shown in partly a displaced position and undergoing its folding action.

The accompanying drawings illustrate one desirable form of the apparatus, and in part the illustrations will be diagrammatically illustrative of the invention. Various forms and arrangements of parts may be modified to better meet constructional requirements without departing from the theory and scope of the invention.

Referring now more in particular to the drawings, wherein the parts throughout the several views are designated by the same reference characters, the numeral 1 points out the main body structure, or fuselage, of the craft to which the folding gear is attachable. The present design gear is highly adaptable to be installed within the V type, or triangular, fuselage. This form of fuselage is found to have great rigidity and strength, its angular construction giving the most natural bracing effect possible with minimum number of structure parts. The aeroplane wings are omitted from the drawings, they not being necessary for a comprehensible understanding of the invention. The members 2 may be taken to illustrate the position of the aerofoil surfaces of the craft when either of the monoplane or biplane type.

In the drawings, the numeral 3 shows a pair of axle-stanchions which are carried in a pivotal relation to the fuselage, and mounted thereupon in such a manner as to cause them to disappear or fold up in a partially concealed manner within the fuselage. These members carry the landing wheels, said wheels being of the conventional type and employing shock absorbers. Shafts 4 and 5 are journaled in a frame 6 which is carried within the fuselage rigidly attached thereto. Upon the shafts are freely journaled a pair of meshing gears 7 and 8. The former gear 7 is carried upon the longer shaft and is provided with a concentric depression 9 which opens into a shouldered recess 10 formed in the face of the gear. This shouldered recess extends a predetermined number of degrees around the circumference of the gear and receives a floating dog 11 which is pinned or otherwise fixed upon the shaft 4. A pair of bevel gears 12 and 13 are mounted aft of the former gears and this latter set is arranged somewhere adjacent the pilot's seat. The former gear 12 is fixed upon the rear end of the shaft 4 and meshes with the gear 13 which is in turn fixed upon a vertical shaft 14 fitted with a suitable foot-bar 15 and hand-lever 16. These latter mentioned members provide the pilot with a convenient means of actuating the apparatus from his seat, and as described, allows him to use either his hands or feet, or both, in carrying out the operation. It is now seen that the dog 11 is rotated through a certain arc of movement before the gear 7 is picked up thereby and moved forward with the shaft. When the gear is engaged by the dog, then both gears, 7 and 8, move in unison under the action of the manual exercise of the pilot exerted at the foot-bar or lever. The companion gears 7 and 8 are provided with deep recesses which receive the upper ends of the axle-stanchions, said ends being permanently and substantially fixed therein.

A drum 17 is fixed upon the shaft 4 and rotates therewith. This drum is grooved on the circumference and carries wound thereupon several turns of control cable with the extremity of one of these cables passing away from the drum as designated by the numeral 18. Another cable is wound upon the drum and confined in the grooves and leads off from the drum as shown by 19, and extends transversely of the shaft and in the opposite direction to the cable 18.

A pair of foldable struts 20 are disposed on either side of the fuselage and pivoted thereto at 21. The lower ends of the struts are in turn pivoted to the axle-stanchions adjacent the ground wheels. These struts form a straightline support from the fuselage down to the wheels, and distribute the landing stresses from the wheels to the fuselage body. The struts are formed in two sections, each being pivoted upon the other at a point 22. A steel slip locking collar 23 is confined on one of the strut sections and is adapted to undergo a sliding displacement thereupon. This sleeve is, in this instance, provided with a lower projecting lip which extends across the line of the pivotal joint of the two sections, thus locking said joint against any tendency to open. A bracket 24 is secured to the other strut section and adapted to lap over the sleeve when said sleeve assumes its normal locked position. This arrangement further insures the alinement and rigidity of the strut 20. A pulley and collar fitting 25 is fixed on the upper strut section, and a compression spring 26 is confined on the strut between the members 23 and 25 and presses the slip collar into locked position over the pivot joint. An axle brace 21ª is pivoted at its upper extremity to the body of the craft, its pivot joint being axially alined with the pivot 21. The lower extremity of this brace has connection with the axle stanchion and may be fitted with shock absorbers if desired to relieve the landing stresses. When the foldable gear apparatus undergoes its upward movement, the brace member likewise pivots and follows the wheel and axle member. It will assume a position alongside the body of the craft in folded position. The assembly of the landing gear partakes of the triangular construction throughout and is of the strongest possible design.

The cables 18 and 19 coming from the drum are passed over the pulleys and connected with the locking collar. Said locking members are therefore capable of being slid upwardly by rotating the drum.

In the operation of this folding landing gear the pilot from his seat subjects the hand lever or the foot-bar to a turning movement. The shaft starts rotating the drum which pulls the cable and slips each sleeve upwardly away from the pivots 22. The strut which was rigidly stiff longitudinally and alined in a supporting position has now become broken, or capable of such, at the joint. During this operation the shaft 4 was not acting on the gear 7 due to the free movement of the dog in the recess of said gear. But by the time the strut locks are entirely free the shaft and coacting dog have moved into engagement with the shoulder on the gear and immediately the gears 7 and 8 are rotated. This causes the axle-stanchions to be swung about the gears as a center and move upwardly toward the fuselage. The body or fuselage will be so designed and provided with receiving space as to permit the wheels and attendant parts to pass into the body and from external view. When it is desired to return the alighting gear to exposed and extended position, it is only necessary to reverse the movement on the control members 15 or 16. And when the wheels are again in normal position the compression spring will force the locking slip sleeve into position, and the craft will be ready for landing.

The present design and the disclosed apparatus has in view maintenance of balance, and the shifting of the parts from concealed position to extended position will not disturb the static or dynamic balance of the craft or plane. The use of this apparatus upon future modern planes will very materially improve the general appearance and in fact will impart to the whole structure a streamline form similar to that of a bird.

In the drawings the apparatus is generally disclosed in its normal landing position. The views also show the position of the wheels when folded within the body. As previously mentioned, this gear is here shown installed within the modern V type fuselage which it is thought may come into general use, and the present design of foldable gear is very adaptable to same.

The details of the pivot joints and the strut locking means are so illustrated as to give best understanding to the theory of operation. The refinement in these parts and their general simplification in construction will come within the scope of the present disclosure.

The invention is presented to include all changes in design, any modifications in form, and operation as may be construed to come within the purview of the following claims.

Claims:

1. In a folding landing and running gear for aircraft, the combination with alighting wheels, a pair of axle stanchions, a pair of struts provided to brace the axle stanchions, a pivotal means provided for the above recited members, a foot and hand control device mounted adjacent the pilot's seat, and means intermediate the above apparatus to impart operation from the foot and hand control device to the wheels, stanchions and struts in such a manner as to fold them into concealed position within the inclosed body of the craft.

2. In a landing gear for aircraft which is capable of being folded from view into the inclosed body of the craft, the combination with a pair of axle stanchions, wheels carried thereupon, a pair of coacting struts comprising foldable sections said struts arranged to receive the weight of the craft and take the stresses due to landing, a pair of gears having connection with the axle-stanchions, and a hand and foot control means for operating the gears.

3. A foldable landing gear for aircraft, the combination of ground wheels, with a set of folding axles, a locking means therefor, a gear set, a drum, and handle, and a cable passing from the drum to the locking means for releasing the locking means, and a means provided for imparting movement from the handle to the gear set, and the said gear set adapted to fold the ground wheels upwardly.

4. In a folding landing gear for aircraft, a pair of axle-stanchions fitted with wheels said axles being mounted in a pivotal relation with the craft, a pair of struts comprising foldable sections said struts having the lower ends pivoted to the axles and their upper ends pivoted to the body of the plane or craft, a locking slip sleeve confined upon the foldable strut and capable of locking said strut against folding tendency, a compression spring adapted to move the locking slip sleeve into a locked position, a pair of intermeshing gears journaled in a rotating relation with the craft and adapted to receive the upper ends of the axle-stanchions in a connected manner for swinging the axle-stanchions about the gear centers when said gears undergo rotation, a control means at the pilot seat for actuating the gears, a drum, flexible control cable wound on said drum and connecting with the locking slip sleeves with the operation of all the cooperating elements so timed as to unlock the slip sleeves prior to the time that the gears rotate and lift the axle-stanchions.

In testimony whereof I affix my signature.

FRANK McCARROLL.

Witnesses:
 Aug. S. Guillot,
 Esther Fondren.